US009891954B2

United States Patent
Antony et al.

(10) Patent No.: US 9,891,954 B2
(45) Date of Patent: Feb. 13, 2018

(54) CLUSTER RESOURCE MANAGEMENT IN A VIRTUALIZED COMPUTING ENVIRONMENT

(71) Applicant: VMWARE, INC., Palo Alto, CA (US)

(72) Inventors: Jinto Antony, Bangalore (IN); Manikandan Ramasubramanian, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 143 days.

(21) Appl. No.: 14/601,264

(22) Filed: Jan. 21, 2015

(65) Prior Publication Data

US 2016/0124774 A1    May 5, 2016

(30) Foreign Application Priority Data

Nov. 4, 2014  (IN) .......................... 5526/CHE/2014

(51) Int. Cl.
*G06F 12/00* (2006.01)
*G06F 9/50* (2006.01)

(52) U.S. Cl.
CPC .......... *G06F 9/5016* (2013.01); *G06F 9/5077* (2013.01)

(58) Field of Classification Search
None
See application file for complete search history.

(56) References Cited

U.S. PATENT DOCUMENTS

| 2007/0288921 | A1* | 12/2007 | King | G06F 9/45537 |
| | | | | 718/1 |
| 2014/0196049 | A1* | 7/2014 | Bobroff | G06F 9/45558 |
| | | | | 718/104 |
| 2016/0048464 | A1* | 2/2016 | Nakajima | G06F 12/1475 |
| | | | | 711/152 |

\* cited by examiner

*Primary Examiner* — Baboucarr Faal (57) ABSTRACT

Techniques for managing computing resources in a cluster are disclosed. In one embodiment, a method includes identifying a virtual machine requiring additional memory. The virtual machine runs on a first host computing system. Further, the method includes determining that the virtual machine does not need additional central processing unit (CPU) resources. Furthermore, the method includes identifying at least one other host computing system having the required additional memory and allocating the required additional memory available in the at least one other host computing system to the virtual machine using a connection to each host computing system having the required additional memory.

22 Claims, 6 Drawing Sheets

CLUSTER RESOURCE MANAGEMENT IN A VIRTUALIZED COMPUTING ENVIRONMENT

RELATED APPLICATIONS

Benefit is claimed under 35 U.S.C. 119(a)-(d) to Foreign application Serial No. 5526/CHE/2014 filed in India entitled "CLUSTER RESOURCE MANAGEMENT IN A VIRTUALIZED COMPUTING ENVIRONMENT", filed on Nov. 4, 2014, by VMware, Inc., which is herein incorporated in its entirety by reference for all purposes.

TECHNICAL FIELD

The present disclosure relates generally to cluster resource management and, more particularly, to methods, techniques, and systems for managing cluster resources available in a virtualized computing environment.

BACKGROUND

Computer virtualization is a technique that involves encapsulating a representation of a physical computing machine platform into a virtual machine (VM) that is executed under the control of virtualization software running on hardware computing platforms (also referred to herein as "host computing systems" or "servers"). A group of hardware computing platforms may be organized as a cluster to provide hardware resources, such as memory, central processing units (CPUs) and so on, for VMs. Each VM is a complete execution environment, and the server provides a user interface over the network connection so that user inputs and outputs are communicated between the user and the VM. It is desirable to provide a desktop experience to the end-user when using remote services similar to the experience users have when using a traditional system where programs execute locally. The quality of the user experience can vary based on many underlying factors such as round-trip latency or network bandwidth.

A VM executing on a host computing system will typically be limited to the resources (such as memory space, CPU cycles, network bandwidth, and so on) of that host computing system. For example, the VMs executing on a first host computing system typically share the resources of the first host computing system and the VMs executing on a second host computing system typically share the resources of the second host computing system. The performance of a VM will depend on the resources of the host computing system on which the VM is executing, as well as the demands of any other VMs executing on the same host computing system. This "single" platform represents an undesirable limitation in some situations.

Further, multiple VMs are consolidated to fewest possible in a manner that the resource is utilized effectively. This ensure that adequate computing resources, such as CPU, physical memory and the like, are available for the VMs. Once VMs are consolidated it might be possible to put some host computing systems into standby mode to save power. For CPU and/or memory resource management, some systems/methods implement a "migration" of a running VM from one host computing system to another.

DETAILED DESCRIPTION

Embodiments described herein provide enhanced computer-based and network-based methods, techniques, and systems for managing computing resources available in a cluster. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The term "virtual machine memory" refers to physical memory that is assigned to VMs running on a host computing system above the virtual machine reservations (i.e., a minimum amount of physical memory that the host computing system reserves for the VM) and below the virtual machine limit (i.e., a maximum amount of physical memory that the host computing system can allocate to the VM) to increase the physical memory used for the VM in the host computing system. It can be noted that other vendors may specify parameters using different terminology and having slightly different functionality. For example, it is known to configure a VM with startup, minimum and maximum memory values.

The term "additional memory" refers to additional physical memory required for a VM running on a host computing system to increase the virtual machine memory beyond the maximum amount of physical memory that the host computing system can allocate to the VM. Further, the term "additional central processing unit (CPU)" refers to additional CPU required for a VM running on a host computing system beyond the maximum CPU that the host computing system can allocate to the VM. Furthermore, the term "memory" is used herein to refer to physical memory associated with host computing systems.

Multiple VMs are consolidated to fewest possible in a manner that the resource is utilized effectively. This ensure that adequate computing resources, such as CPU, physical memory and the like, are available for the VMs. Once VMs are consolidated it might be possible to put some host computing systems into standby mode to save power. For CPU and/or memory resource management, some systems/methods implement a "migration" of a running VM from one host computing system to another, which can include significant cost and utilizes significant amount of resources.

In VMs, some applications may require high memory but less CPU cycles. In this case, some systems/methods perform migration of a VM even though when the CPU resource is available on the same host computing system but because of shortage of the memory resource. Furthermore, some systems/methods may not be able to perform migration of a VM when there is no host computing system which can satisfy the memory and CPU requirements of the VM. In addition, some systems/methods may not be able to perform migration of a VM when there are host computing systems which are not compatible with migration of the VM.

The example technique enables a VM running on a host computing system to access memory from at least one other host computing system using an RDMA-enabled network connection when there is a memory resource shortage in the host computing system. In an example embodiment, when a VM running on a host computing system needs additional memory but not additional CPU, then the VM can access the memory from at least one other host computing system using RDMA-enabled network connection. In this case, a memory mirror file of the memory that the VM utilizes from the at least one other host computing system is stored in a shared datastore. This memory mirror file can be accessed by the VM when the at least one other host computing system is down (e.g., due to hardware failure, network connectivity failure, and/or system maintenance activity). Further, when a VM running on a host computing system needs both additional CPU and additional memory, then the VM can be migrated to another host computing system to satisfy the VM's requirement.

System Overview and Examples of Operation

Figure 1:
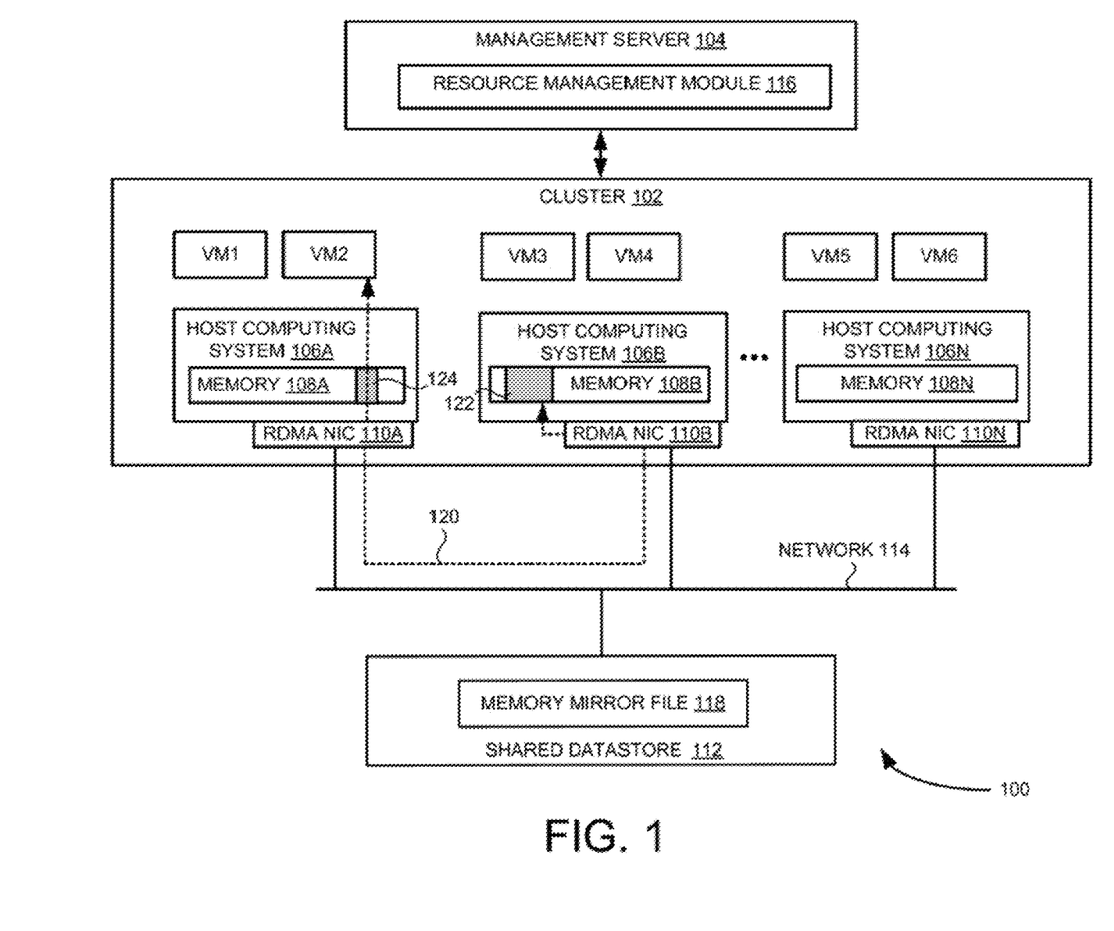
FIG. 1 is an example block diagram of a cluster illustrating a virtual machine (VM) running on a host computing system accessing memory associated with another host computing system using a remote direct memory access (RDMA)-enabled network connection.

FIG. 1 is example block diagram 100 of cluster 102 illustrating VM2 running on host computing system 106A accessing memory 108B associated with host computing system 106B using connection 120. Particularly, FIG. 1 illustrates cluster 102 communicative with management server 104. Further, cluster 102 includes host computing systems 106A-N having associated VMs running therein. Furthermore, host computing systems 106A-N include memories 108A-N, respectively. In one example, each of memories 108A-N includes a part of memory for host computing system requirements and a part of memory assigned to VMs (i.e., virtual machine memory). Host computing system requirements represent memory that is used by other host functions, such as memory used by a virtualization software layer (i.e., a hypervisor).

Further, host computing systems 106A-N are associated with RDMA network interface cards (NICs) 110A-N, respectively. Furthermore, each host computing system 106A-N is connected to shared datastore 112 via network 114. For example, shared datastore 112 can be an Internet small computer system interface (iSCSI) datastore. Network 114 includes a local area network (LAN) and/or RDMA-enabled network.

Further as shown in FIG. 1, management server 104 includes resource management module 116. Resource management module 116 determines VM2 running on host computing system 106A as requiring additional memory. In one example, additional memory refers to additional physical memory required for VM2 to increase the virtual machine memory beyond the maximum amount of physical memory that host computing system 106A can allocate to VM2. Furthermore, resource management module 116 allocates the required additional memory (i.e., memory 122) from memory 108B available in host computing system 106B to VM2 using connection 120 to host computing system 106B. For example, connection 120 includes an RDMA-enabled network connection or host bus interconnect hardware. In one example, RDMA-enabled network connection is a mechanism by which remote memory can be included in the local address space via the RDMA NICs (e.g., RDMA NICs 100A and 110B associated with host computing systems 106A and 106B, respectively). In one example embodiment, when required additional memory 122 is accessed by VM2 for a predefined time, then resource management module 116 recommends migration of VM2 running on host computing system 106A to host computing system 106B based on computing resources available on host computing system 106B.

Furthermore, resource management module 116 identifies a buffer size required for VM2 and assigns buffer 124 with the identified buffer size from memory 108A associated with host computing system 106A to VM2 to locally access required additional memory 122 allocated from host computing system 106B. In other words, when VM2 accesses memory from host computing system 106B using RDMA, host computing system 106A maintains a local memory buffer with a specific size. The local memory buffer can be of size which can accommodate a block size of the RDMA and a page size of the memory. For example, consider an RDMA block size as 1024 Kb, and the memory page size as 512 Kb. In this case, the local memory buffer can be of size 2×512 Kb (memory page size)=1×1024 Kb (RDMA block size) which is 1 MB per VM. If there are 8 VMs accessing memory through RDMA, then total memory requirement will be 8×1 MB=8 MB. With the local memory buffer, the memory transfer through RDMA will be effective since the data executed by the CPU can be available locally to host computing system 106A.

In addition, resource management module 116 stores a copy (i.e., memory mirror file 118) of required additional memory 122 allocated from host computing system 106B in shared datastore 112. In one example, when host computing system 106B is down (e.g., due to hardware failure, network connectivity failure, and/or system maintenance activity), memory mirror file 118 can be accessed by VM2 from shared datastore 112. In another example, when host computing system 106A is down, memory 122 assigned to VM2 can be reclaimed by host computing system 106B and memory mirror file 118 in shared datastore 112 can be deleted.

Figure 2:
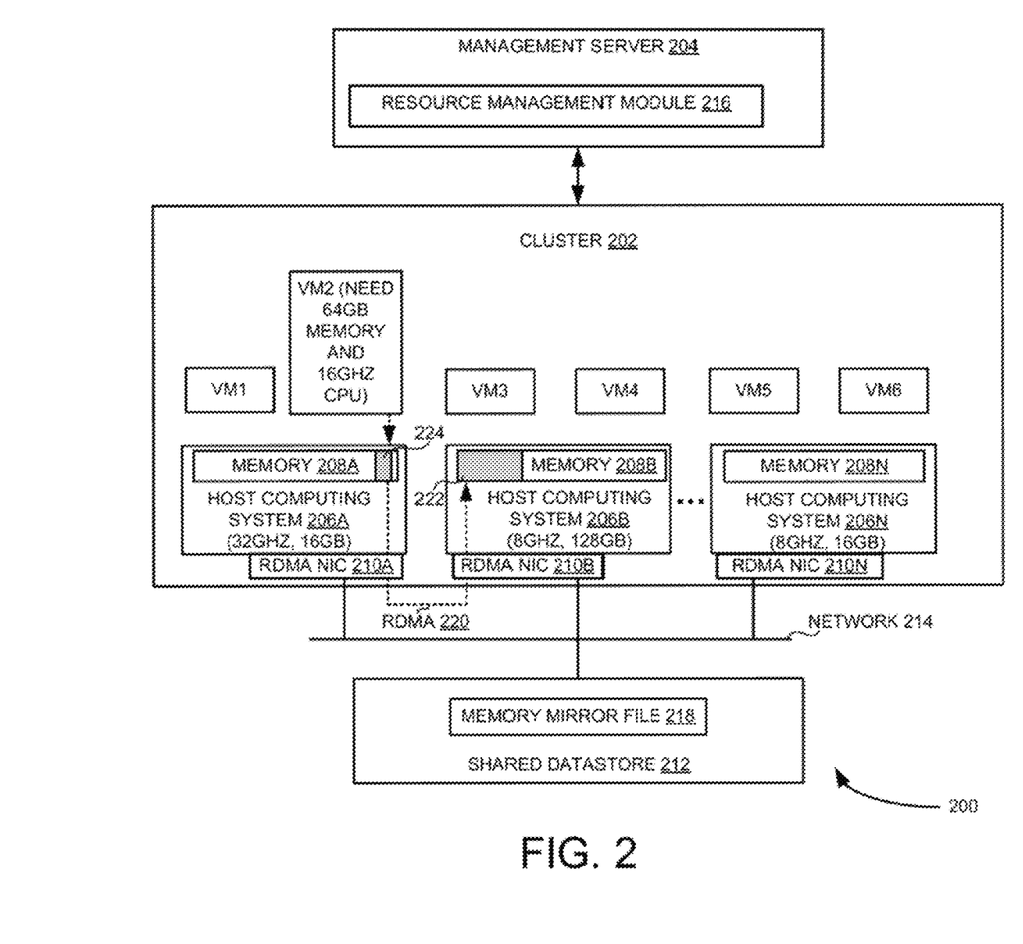
FIG. 2 is another example block diagram of a cluster illustrating allocating required additional memory available in a host computing system to a VM running on another host computing system using an RDMA-enabled network connection.

FIG. 2 is another example block diagram 200 of cluster 202 illustrating allocating required additional memory available in host computing system 206B to VM2 running on host computing system 206A using RDMA-enabled network connection 220. Particularly, FIG. 2 illustrates cluster 202 communicative with management server 204. Further, cluster 202 includes host computing systems 206A-N having associated VMs running therein. Furthermore, host computing systems 206A-N include memories 208A-N, respectively. Host computing systems 206A-N are associated with RDMA NICs 210A-N, respectively. Also, each host computing system 206A-N is connected to shared datastore 212 via network 214. Further as shown in FIG. 2, management server 204 includes resource management module 216.

In the example shown in FIG. 2, host computing system 206A includes 16 GB of memory and 32 GHz of CPU available for assigning to VMs. Similarly, host computing system 206B includes 128 GB of memory and 8 GHz of CPU available for assigning to VMs and host computing system 206N includes 16 GB of memory and 8 GHz of CPU available for assigning to VMs.

In operation, resource management module 216 determines VM2 running on host computing system 206A as requiring additional memory. Further, resource management module 216 determines whether VM2 requires additional CPU. In the example shown in FIG. 2, VM2 requires 64 GB of memory and 16 GHz of CPU. Host computing system 206A with 16 GB of available memory and 32 GHz of available CPU can satisfy the CPU requirement of 16 GHz for VM2, however, cannot satisfy the memory requirement of 64 GB for VM2. In this example, VM2 requires an additional memory of 48 GB and does not require any additional CPU. In this embodiment, resource management module 216 determines host computing system 206B as having 128 GB of memory available and allocates the required additional memory (i.e., memory 222) from memory 208B available in host computing system 206B to VM2 using RDMA-enabled network connection 220. Alternatively, any bus interconnect hardware can also be used to assign memory from host computing system 206B to VM2.

Further, resource management module 216 identifies a buffer size required for VM2 and assigns buffer 224 with the identified buffer size from memory 208A associated with host computing system 206A to VM2 to locally access required additional memory 222 allocated from host computing system 206B. In addition, resource management module 216 stores a copy (i.e., memory mirror file 218) of required additional memory 222 allocated from host computing system 206B in shared datastore 212.

Figure 3:
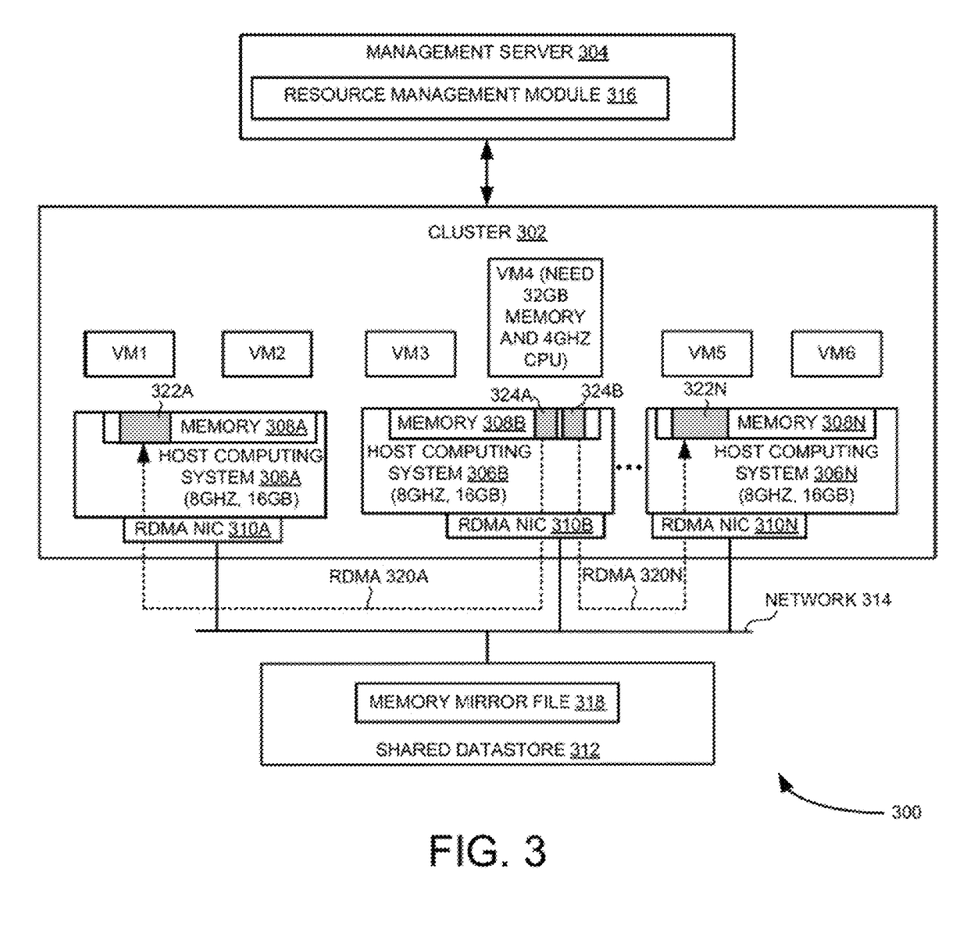
FIG. 3 is another example block diagram of a cluster illustrating allocating required additional memory available in a set of host computing systems to a VM running on another host computing system using RDMA-enabled network connections.

FIG. 3 is another example block diagram 300 of cluster 302 illustrating allocating required additional memory available in a set of host computing systems 306A and 306N to VM4 running on host computing system 306B using RDMA-enabled network connections 320A and 320N. Particularly, FIG. 3 illustrates cluster 302 communicative with management server 304. Further, cluster 302 includes host computing systems 306A-N having associated VMs running therein. Furthermore, host computing systems 306A-N include memories 308A-N, respectively. Also, host computing systems 306A-N are associated with RDMA NICs 310A-N, respectively. In addition, each host computing system 306A-N is connected to shared datastore 312 via network 314. Further as shown in FIG. 3, management server 304 includes resource management module 316. In the example shown in FIG. 2, each of the host computing systems 306A-N includes 16 GB of memory and 8 GHz of CPU available for assigning to VMs.

In operation, resource management module 316 determines VM4 running on host computing system 306B as requiring additional memory. Further, resource management module 316 determines whether VM4 requires additional CPU. In the example shown in FIG. 3, VM4 requires 32 GB of memory and 4 GHz of CPU. Host computing system 306B with 16 GB of available memory and 8 GHz of available CPU can satisfy the CPU requirement of 4 GHz for VM4, however, cannot satisfy the memory requirement of 32 GB for VM4. In this case, VM4 requires an additional memory of 16 GB. In this embodiment, resource management module 316 determines host computing systems 306A and 306N as having 16 GB of memory available and allocates the required additional memory (i.e., memories 322A and 322N) from host computing systems 306A and 306N to VM4 using RDMA-enabled network connections 320A and 320N, respectively. In this case, a part of additional memory 322A required for VM4 is assigned from host computing system 306A and remaining part of additional memory 322N required for VM4 is assigned from host computing system 306N.

Further, resource management module 316 identifies a buffer size required for VM4 and assigns buffers 324A and 324B with the identified buffer size from memory 308B associated with host computing system 306B to VM4 to locally access the required additional memory (i.e., memories 322A and 322N) allocated from host computing systems 306A and 306N. In addition, resource management module 316 stores a copy (i.e., memory mirror file 318) of the required additional memory (i.e., memories 322A and 322N) allocated from host computing systems 306A and 306N in shared datastore 312.

In another example embodiment, consider VM4 running on host computing system 306B as requiring additional CPU. In this case, resource management module 316 identifies another host computing system having required CPU available to host VM4. Further, resource management module 316 performs migration of VM4 to the identified host computing system. Furthermore, resource management module 316 allocates the required CPU available in the identified host computing system to the migrated VM4. In addition, resource management module 316 allocates required memory locally from the identified host computing system and/or remotely from one or more other host computing systems to the migrated VM4 based on the memory available in the identified host computing system. For example, if required memory is available locally in the identified host computing system then the required memory is allocated from the identified host computing system to migrated VM4. If required memory is not available locally in the identified host computing system, then the required additional memory is allocated from one or more other host computing systems using RDMA-enabled network connection.

Example Processes

Figure 4:
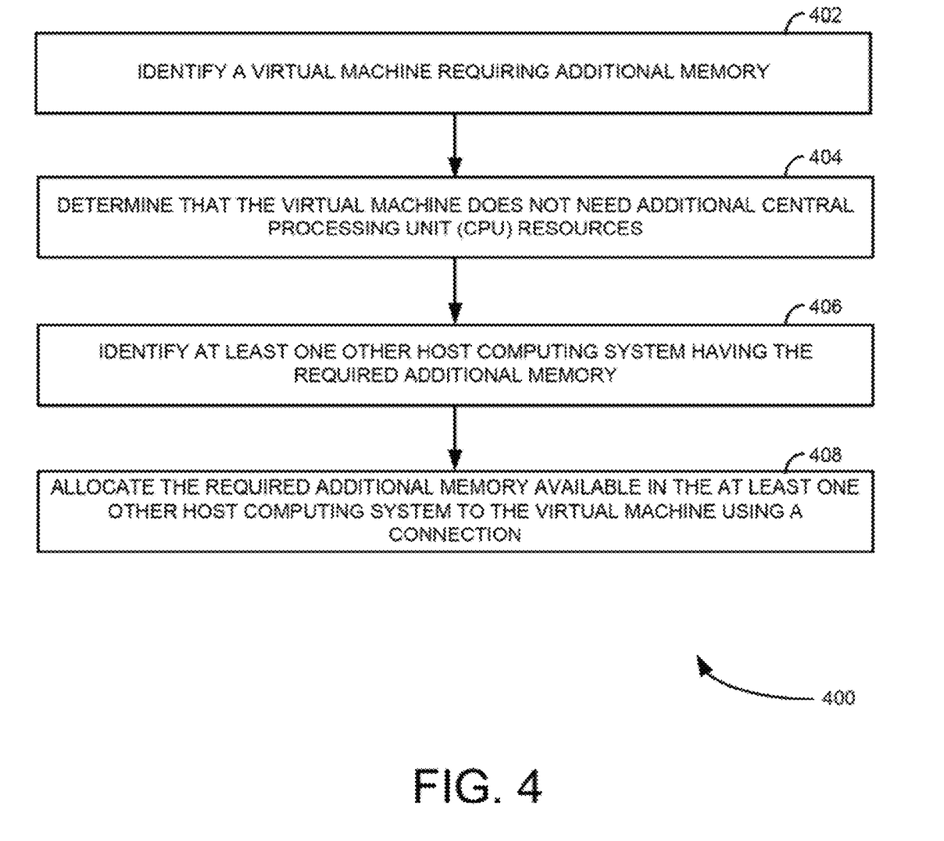
FIGS. 4 and 5 are example flow diagrams for managing computing resources available in a cluster.

FIG. 4 is example flow diagram 400 for managing computing resources in a cluster. At step 402, a VM requiring additional memory is identified. The VM runs on a first host computing system in the cluster. At step 404, it is determined that the VM does not need additional central processing unit (CPU) resources. At step 406, at least one other host computing system having the required additional memory is identified. At step 408, the required additional memory available in the at least one other host computing system is allocated to the VM using a connection to each host computing system having the required additional memory. The detailed process for managing the computing resources in the cluster is explained in FIG. 5.

Figure 5:
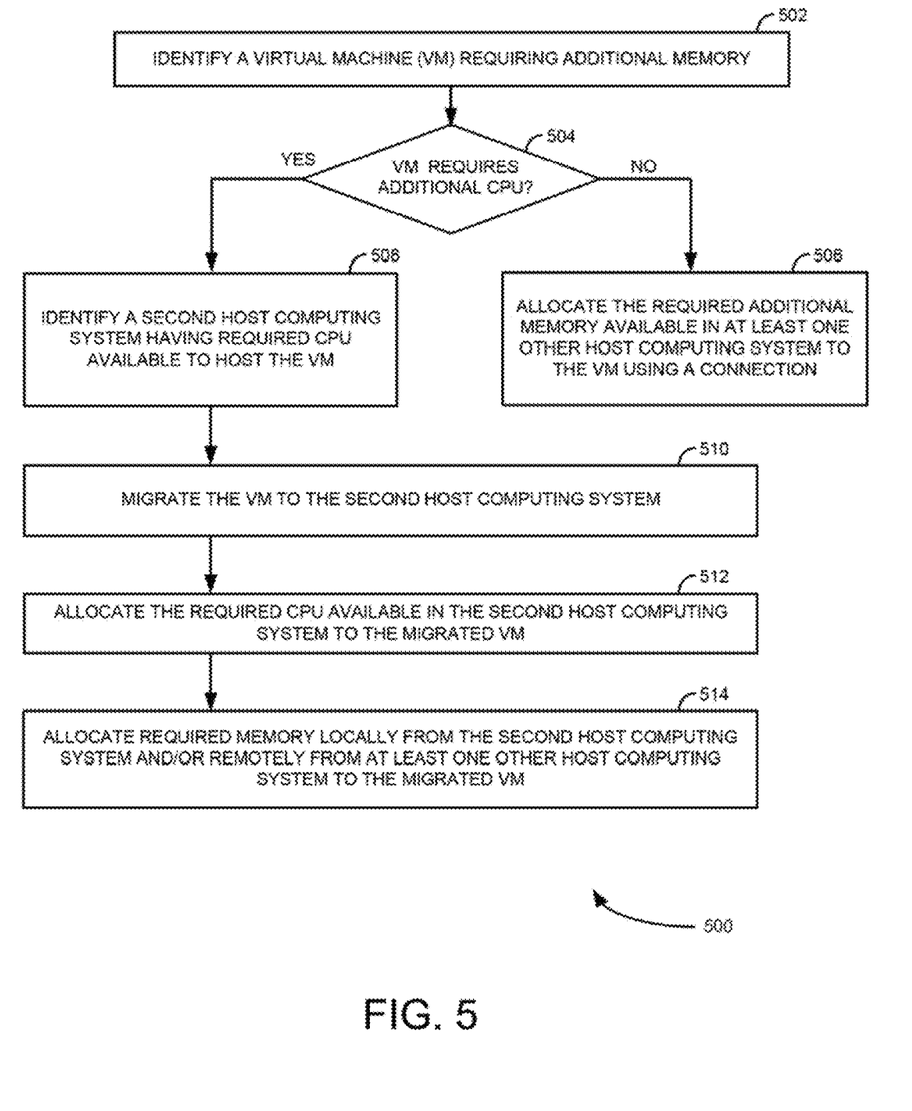

FIG. 5 is example flow diagram 500 for managing computing resources in a cluster. At step 502, a VM running on a first host computing system requiring additional memory is identified. In one example, additional memory refers to additional physical memory required for the VM to increase the VM's memory beyond the maximum amount of physical memory that the first host computing system can allocate to the VM. In other words, additional memory refers to an amount of physical memory that is not available on the first host computing system for allocating to the VM.

At step 504, a check is made to determine whether the VM running on the first host computing system requires additional CPU resources. In one example, additional CPU resource refers to additional CPU resource that is not available on the first host computing system for allocating to the VM. At step 506, if the VM does not require additional CPU, the required additional memory available in at least one other host computing system is allocated to the VM using a connection (e.g., RDMA-enabled network connection and/or host bus interconnect hardware) to each host computing system having the required additional memory.

In one embodiment, a second host computing system having the required additional memory is identified. Further, the required additional memory available in the second host computing system is allocated to the VM using a connection to the second host computing system. Further, migration of the VM to the second host computing system is recommended when the required additional memory associated with the second host computing system is accessed remotely for a predefined time.

In another example embodiment, the required additional memory is identified from a set of host computing systems. For example, the required additional memory includes a portion of memory from each of the set of host computing systems. Further, the required additional memory available in the set of host computing systems is allocated to the VM using a connection to each of the set of host computing systems.

When the VM accesses memory from at least one other host computing system using the connection, the first host computing system needs to maintain a local memory buffer with a specific size. In this case, a buffer size required for the VM running on the first host computing system is identified and buffer with the identified buffer size is assigned from memory associated with the first host computing system to the VM to locally access the required additional memory allocated from the at least one other host computing system. Further, a copy of the required additional memory allocated from the at least one other host computing system is stored in a shared storage.

At step 508, if the VM requires additional CPU resources, a second host computing system having required CPU resources available to host the VM is identified. At step 510, the VM is migrated to the second host computing system. At step 512, the required CPU available in the second host computing system is allocated to the migrated VM. At step 514, required memory is allocated either locally from the second host computing system and/or remotely from at least one other host computing system to the migrated VM using RDMA-enabled network connection based on the memory available in the second host computing system.

The systems and methods as described in FIGS. 1-5 can reduce performing migration of VMs, which involves significant cost and resources. Further, the systems and methods as described in FIGS. 1-5 can manage memory requirements of VMs in some cases where a host computing system with enough computing resources is not available for migrating the VM. The systems and methods as described in FIGS. 1-5, in some cases, may also be applicable for host computing systems that are not compatible with migration of the VM. The systems and methods as described in FIGS. 1-5 can provide a VM with memory usage more than physical memory available on the host computing system on which the VM is running.

Example Computing System Implementation

Figure 6:
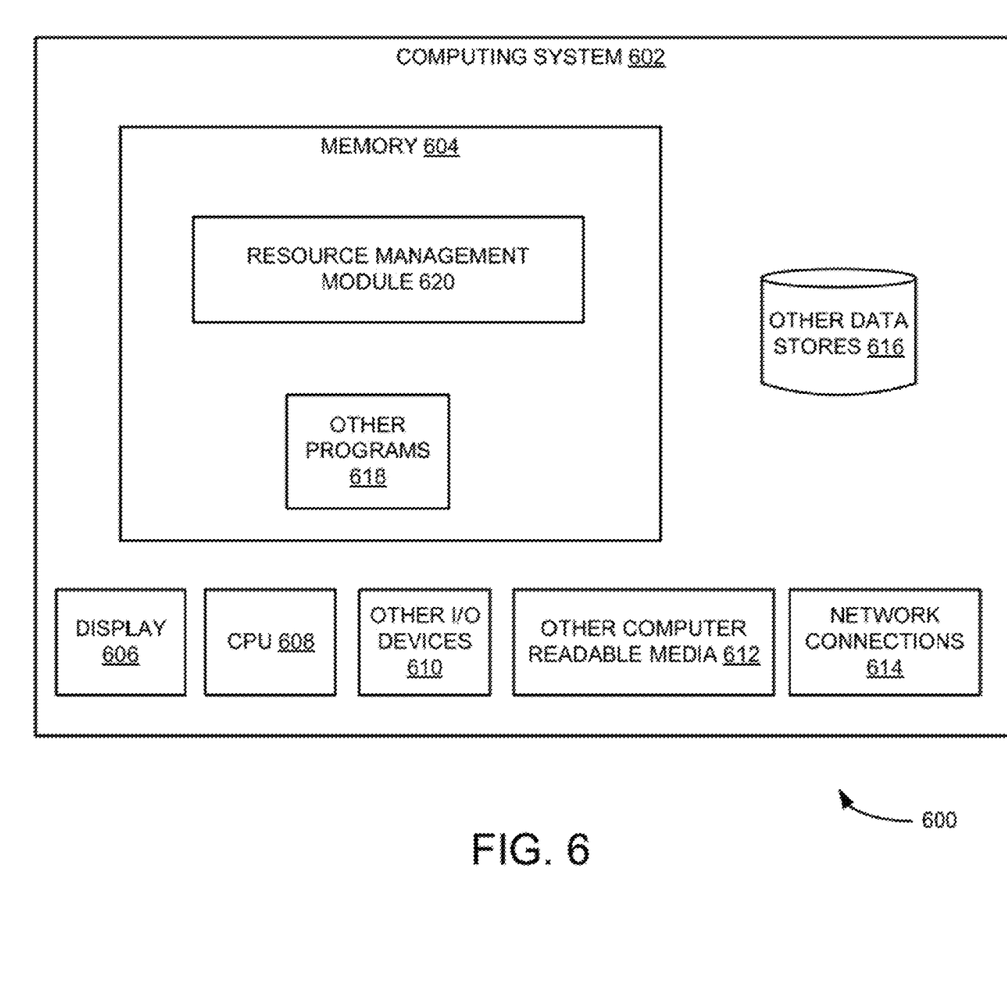
FIG. 6 is a block diagram of an example management server including a resource management module.

FIG. 6 is block diagram 600 of example physical computing system 602 (e.g., management servers 104, 204, and 304 shown in FIGS. 1-3, respectively) including resource management module 620 (e.g., resource management modules 116, 216, and 316 shown in FIGS. 1-3, respectively), according to an example embodiment. In particular, FIG. 6 shows computing system 602 that may be utilized to implement resource management module 620. Note that one or more general purpose virtual or physical computer systems suitably instructed may be used to implement resource management module 620. In addition, computing system 602 may comprise one or more distinct computing systems/devices and may span distributed locations.

In the embodiment shown, computing system 602 may comprise computer memory ("memory") 604, display 606, one or more CPUs 608, input/output devices 610 (e.g., keyboard, mouse, etc.), other computer-readable media 612, and network connections 614. Resource management module 620 is shown residing in memory 604. The components of resource management module 620 may execute on one or more CPUs 608 and implement techniques described herein. Other code or programs 618 (e.g., an administrative interface, a Web server, and the like) may also reside in memory 604, and execute on one or more CPUs 608. Further, other data repositories, such as data store 616, may also reside in computing system 602. One or more of the components in FIG. 6 may not be present in any specific implementation. For example, some embodiments may not provide other computer readable media 612 and/or display 606.

Resource management module 620 interacts via network with host computing systems in the cluster. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

In addition, programming interfaces to the data stored as part of resource management module 620, such as in data store 616, can be available by standard mechanisms such as through C, C++, C#, and Java APIs; libraries for accessing files, databases, or other data repositories; through scripting languages such as XML; or through Web servers. FTP servers, or other types of servers providing access to stored data. Furthermore, in some embodiments, some or all of the components of resource management module 620 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like.

Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The invention claimed is:

1. A method for managing computing resources in a cluster, comprising:
   identifying a virtual machine requiring additional memory, wherein the virtual machine runs on a first host computing system, and wherein the additional memory is not available on the first host computing system for allocating to the virtual machine;
   determining that the virtual machine does not need additional central processing unit (CPU) resources;
   identifying at least one other host computing system having the required additional memory;
   remotely allocating the required additional memory available in the at least one other host computing system to the virtual machine running on the first host computing system using a remote connection from the first host computing system to each host computing system having the required additional memory, wherein the remote connection is a mechanism by which the remotely allocated memory is included in local address space of the first host computing system;
   identifying a buffer size associated with the additional memory required for the virtual machine running on the first host computing system; and
   assigning a local memory buffer with the identified buffer size in memory of the first host computing system to locally access the required additional memory allocated from the at least one other host computing system.

2. The method of claim 1, wherein identifying at least one other host computing system having the required additional memory, comprises:
   identifying a second host computing system having the required additional memory.

3. The method of claim 2, wherein allocating the required additional memory available in the at least one other host computing system to the virtual machine comprises:
   allocating the required additional memory available in the second host computing system to the virtual machine using a connection to the second host computing system.

4. The method of claim 1, further comprising storing a copy of the required additional memory allocated from the at least one other host computing system in a shared storage.

5. The method of claim 1, wherein the connection comprises one of a remote direct memory access (RDMA)-enabled network connection and host bus interconnect hardware.

6. A method for managing computing resources in a cluster, comprising:
   identifying a virtual machine requiring additional memory, wherein the virtual machine runs on a first host computing system;
   determining that the virtual machine does not need additional central processing unit (CPU) resources;
   identifying a second host computing system having the required additional memory;
   allocating the required additional memory available in the second host computing system to the virtual machine using a connection to the second host computing system having the required additional memory; and
   recommending migrating the virtual machine running on the first host computing system to the second host computing system when the required additional memory associated with the second host computing system is accessed remotely for a predefined time.

7. The method of claim 1, wherein identifying at least one other host computing system having the required additional memory, comprises:
   identifying the required additional memory from a set of host computing systems, wherein the required additional memory includes a portion of memory from each of the set of host computing systems.

8. The method of claim 7, wherein allocating the required additional memory available in the at least one other host computing system to the virtual machine comprises:
   allocating the required additional memory available in the set of host computing systems to the virtual machine using a connection to each of the set of host computing systems.

9. A system comprising:
   a cluster comprising a plurality of host computing systems with each host computing system including virtual machines running therein; and
   a management server communicative with the cluster, wherein the management server includes a resource management module to:
      identify a virtual machine requiring additional memory, wherein the virtual machine runs on a first host computing system in the cluster, and wherein the additional memory is not available on the first host computing system for allocating to the virtual machine;
      determine that the virtual machine does not need additional central processing unit (CPU) resources;
      identify at least one other host computing system having the required additional memory;
      remotely allocate the required additional memory available in the at least one other host computing system to the virtual machine running on the first host computing system using a remote connection from the first host computing system to each host computing system having the required additional memory, wherein the remote connection is a mechanism by which the remotely allocated memory is included in local address space of the first host computing system;
      identify a buffer size associated with the additional memory required for the virtual machine running on the first host computing system; and
      assign a local memory buffer with the identified butler size in memory of the first host computing system to locally access the required additional memory allocated from the at least one other host computing system.

10. The system of claim 9, wherein the resource management module is further configured to:
    identify a second host computing system having the required additional memory; and
    allocate the required additional memory available in the second host computing system to the virtual machine using a connection to the second host computing system.

11. The system of claim 9, wherein the resource management module is further configured to;
    identify the required additional memory from a set of host computing systems, wherein the required additional memory includes a portion of memory from each of the set of host computing systems; and
    allocate the required additional memory available in the set of host computing systems to the virtual machine using a connection to each of the set of host computing systems.

12. The system of claim 9, wherein the resource management module is further configured to store a copy of the required additional memory allocated from the at least one other host computing system in a shared storage.

13. The system of claim 9, wherein the connection comprises one of a remote direct memory access (RDMA)-enabled network connection and host bus interconnect hardware.

14. A system comprising:
a cluster comprising a plurality of host computing systems with each host computing system including virtual machines running therein; and
a management server communicative with the cluster, wherein the management server includes a resource management module to:
identify a virtual machine requiring additional memory, wherein the virtual machine runs on a first host computing system in the cluster;
determine that the virtual machine does not need additional central processing unit (CPU) resources;
identify a second host computing system having the required additional memory;
allocate the required additional memory available in the second host computing system to the virtual machine using a connection to the second host computing system having the required additional memory; and
recommend migrating the virtual machine running on the first host computing system to the second host computing system when the required additional memory associated with the second host computing system is accessed remotely for a predefined time.

15. A non-transitory computer-readable storage medium including instructions that are configured, when executed by a computing system, to perform a method for managing computing resources in a cluster, the method comprising:
identifying, a virtual machine requiring additional memory, wherein the virtual machine runs on a first host computing system, and wherein the additional memory is not available on the first host computing system for allocating to the virtual machine;
determining that the virtual machine does not need additional central processing unit (CPU) resources;
identifying at least one other host computing system having the required additional memory;
remotely allocating the required additional memory available in the at least one other host computing system to the virtual machine running on the first host computing system using a remote connection from the first host computing system to each host computing system having the required additional memory, wherein the remote connection is a mechanism by which the remotely allocated memory is included in local address space of the first host computing system;
identifying a buffer size associated with the additional memory required for the virtual machine running on the first host computing system; and
assigning a local memory buffer with the identified buffer size in memory of the first host computing system to locally access the required additional memory allocated from the at least one other host computing system.

16. The non-transitory computer-readable storage medium of claim 15, wherein identifying at least one other host computing system having the required additional memory, comprises:
identifying a second host computing system having the required additional memory.

17. The non-transitory computer-readable storage medium of claim 16, wherein allocating the required additional memory available in at least one other host computing system to the virtual machine comprises:
allocating the required additional memory available in the second host computing system to the virtual machine using a connection to the second host computing system.

18. The non-transitory computer-readable storage medium of claim 15, wherein identifying at least one other host computing system haying the required additional memory, comprises:
identifying the required additional memory from a set of host computing systems, wherein the required additional memory includes a portion of memory from each of the set of host computing systems.

19. The non -transitory computer-readable storage medium of claim 18, wherein allocating the required additional memory available in at least one other host computing system to the virtual machine comprises:
allocating the required additional memory available in the set of host computing systems to the virtual machine using a connection to each of the set of host computing systems.

20. The non-transitory computer -readable storage medium of claim 15, further comprising storing a copy of the required additional memory allocated from the at least one other host computing system in a shared storage.

21. The non-transitory computer -readable storage medium of claim 15, wherein the connection comprises one of a remote direct memory access (RDMA)-enabled network connection and host bus interconnect hardware.

22. A non-transitory computer-readable storage medium including instructions that are configured, when executed by a computing system, to perform a method for managing computing resources in a cluster, the method comprising:
identifying a virtual machine requiring additional memory, wherein the virtual machine runs on a first host computing system;
determining that the virtual machine does not need additional central processing unit (CPU) resources;
identifying a second host computing system baying the required additional memory;
allocating the required additional memory available in the second host computing system to the virtual machine using a connection to the second host computing system having the required additional memory; and
recommending migrating the virtual machine running on the first host computing system to the second host computing system when the required additional memory associated with the second host computing system is accessed remotely for a predefined time.

* * * * *